Dec. 10, 1929.   H. DE F. MADDEN ET AL   1,738,658
METHOD AND MACHINE FOR MAKING PLATE ELECTRODES
Filed June 17, 1925   3 Sheets-Sheet 1
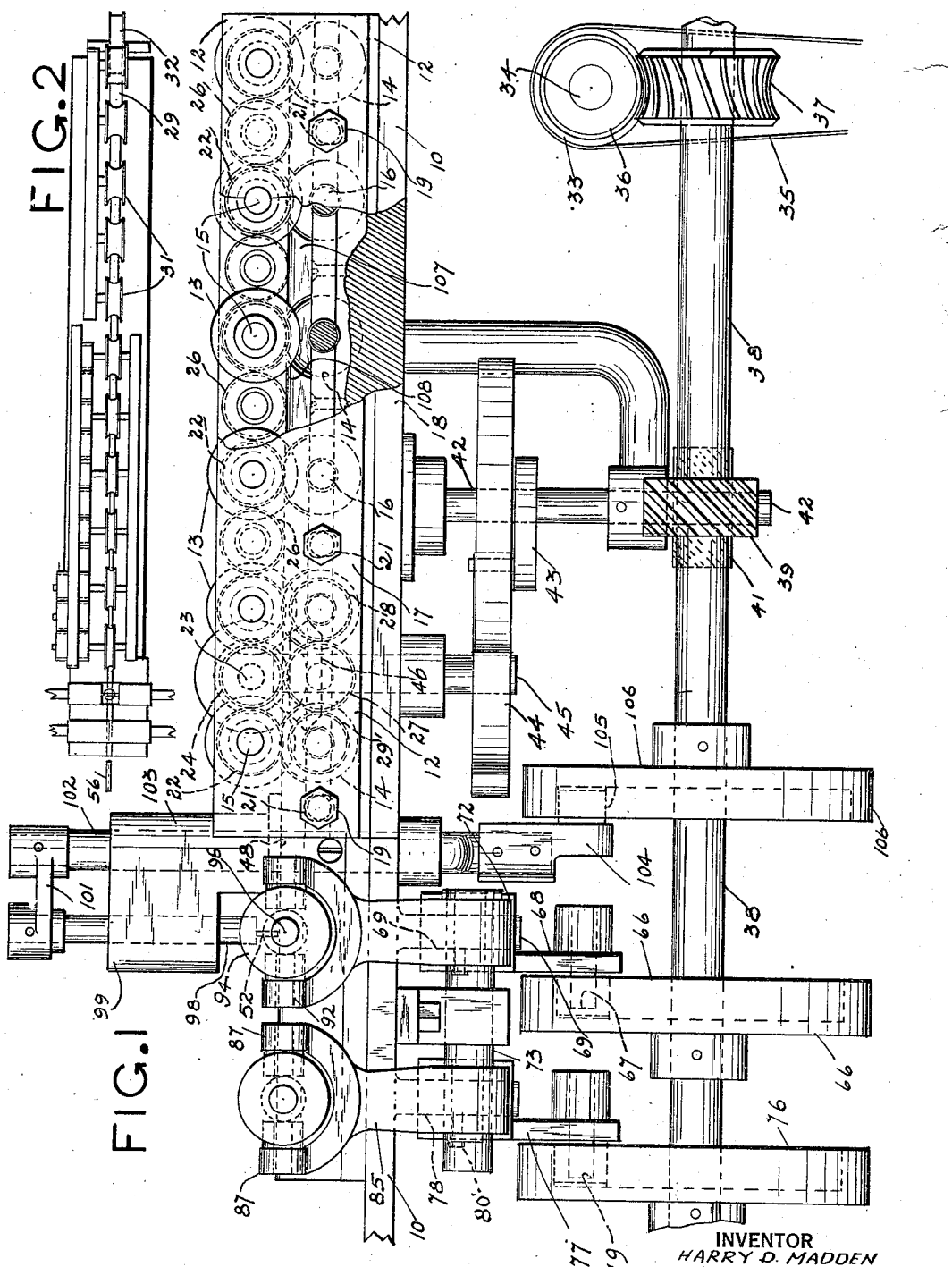
INVENTOR
HARRY D. MADDEN
JOSEPH KIRBY
BY
ATTORNEY Dec. 10, 1929. H. DE F. MADDEN ET AL 1,738,658
METHOD AND MACHINE FOR MAKING PLATE ELECTRODES
Filed June 17, 1925 3 Sheets-Sheet 2
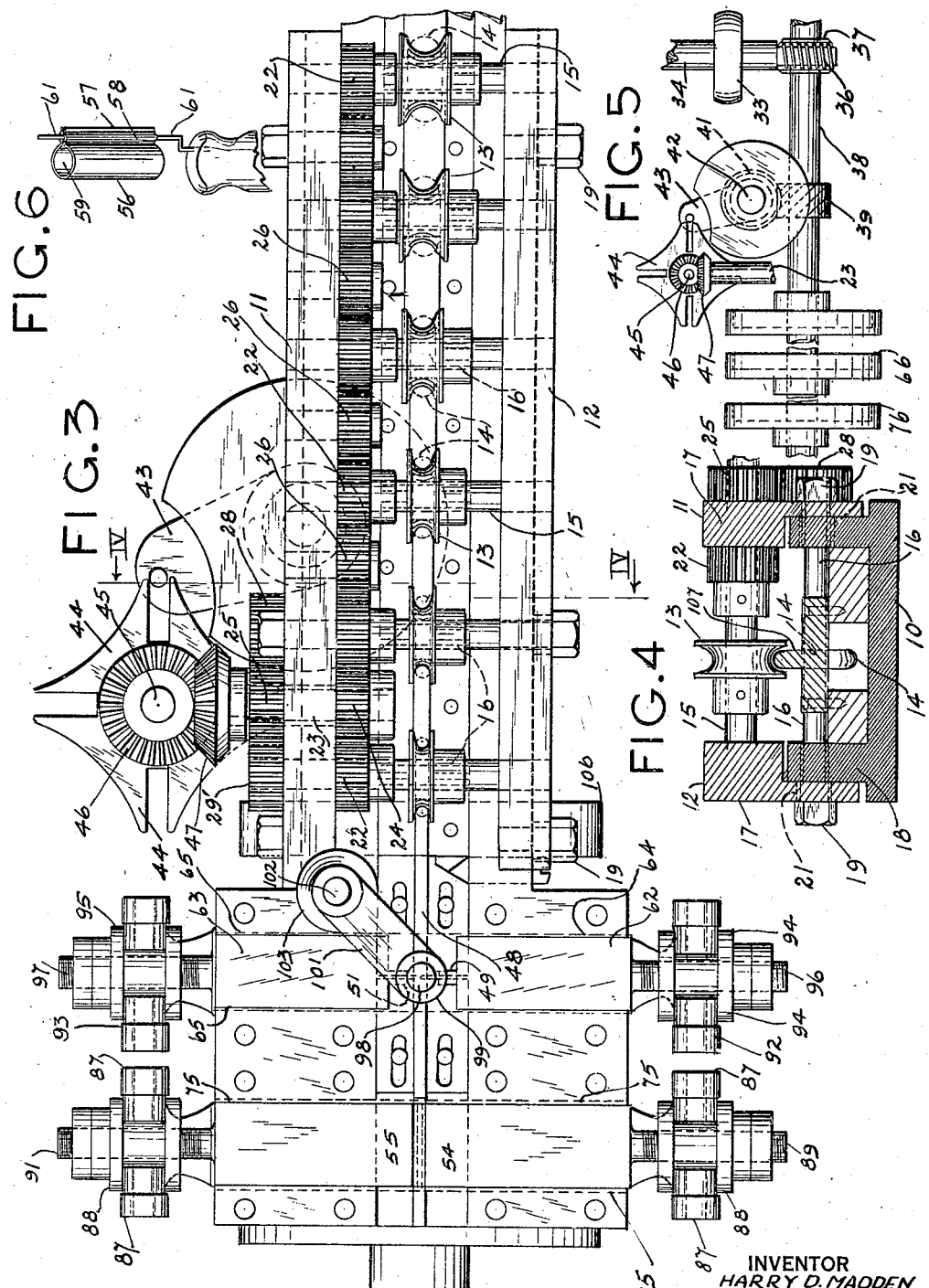
INVENTOR
HARRY D. MADDEN
JOSEPH KIRBY
BY
ATTORNEY Dec. 10, 1929.   H. DE F. MADDEN ET AL   1,738,658
METHOD AND MACHINE FOR MAKING PLATE ELECTRODES
Filed June 17, 1925   3 Sheets-Sheet 3
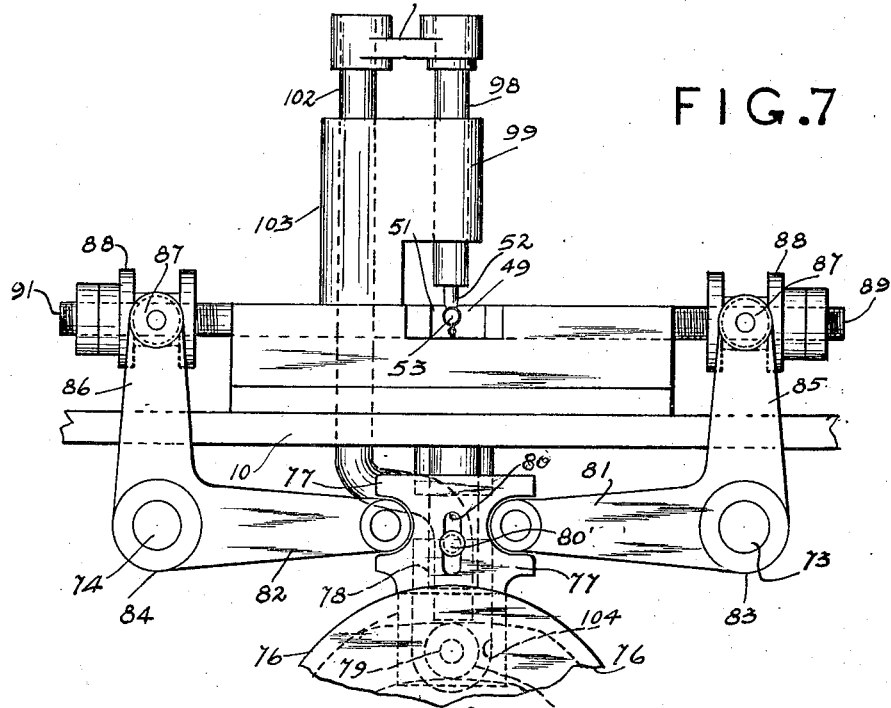
FIG.7
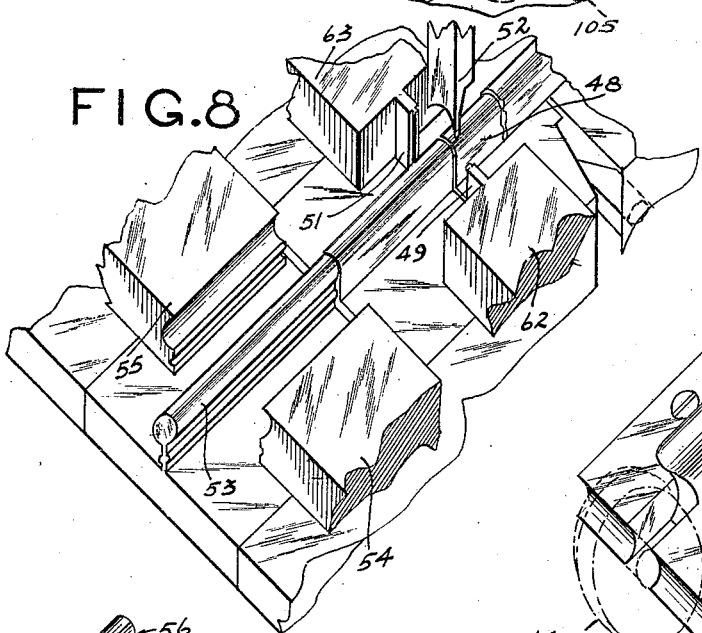
FIG.8
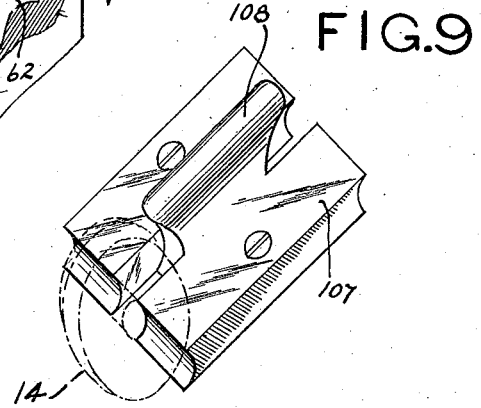
FIG.9
FIG.10
INVENTOR
HARRY D. MADDEN
JOSEPH KIRBY
BY
ATTORNEY Patented Dec. 10, 1929

1,738,658

UNITED STATES PATENT OFFICE

HARRY DE FOREST MADDEN, OF MONTCLAIR, AND JOSEPH KIRBY, OF NEWARK, NEW JERSEY, ASSIGNORS TO WESTINGHOUSE LAMP COMPANY, A CORPORATION OF PENNSYLVANIA

METHOD AND MACHINE FOR MAKING PLATE ELECTRODES

Application filed June 17, 1925. Serial No. 37,691.

This invention relates to the manufacture of electrical devices such as radiotrons and more particularly to the production of a plate anode therefor.

In the manufacture of the various elements of a radio tube a considerable degree of accuracy is required and in tubes of the type which employ a plate or anode of tubular form, it is especially desirable to so construct the plate that the dimensions thereof will remain uniform throughout the manufacture of large quantities of the article.

The type of anode to which the present invention relates may be of any desired configuration in cross section but is preferably of cylindrical form having longitudinal external flanges for engagement with a support wire upon which the anode is subsequently mounted. It will be understood that an anode of this type when in its operative position within a radio tube, surrounds a grid and in order to maintain uniform characteristics of a tube, it is essential that the diameter of the anodes be uniform so that the spacing between the positioned anode and the grid will not vary. Furthermore, it is desirable to produce these electrodes at a relatively high rate of speed and an object of the present invention is, therefore, to provide a machine which will operate to automatically produce radiotron plates or anodes in an efficient, accurate and more expeditious manner than has heretofore been attained.

Another object of the invention is to provide a machine to which a strip of metal may be automatically fed and formed into plates without the constant attendance of an operator.

Another object of the invention is to automatically form a strip of metal to provide a tubular electrode and to sever the same into accurate predetermined lengths.

A further object of the invention is to provide a machine for the production of a tubular electrode by a combined roller and forming operation.

A still further object of the invention is to provide a machine which will operate to intermittently feed a strip of metal to forming members to partially shape the same to plate form and subsequently sever a section of said formed metal and finally press the same to provide a complete plate and to discharge the plate from the machine.

Other objects and advantages will be more fully understood as the description proceeds.

The present embodiment of the invention may comprise a machine including a plurality of pairs of male and female forming members or rollers between which a strip of metal may be fed. The male forming member may have a peripheral convex circular form and the female a concave peripheral form. Thus a strip of metal may be fed between the members and bent to trough-shape.

A plurality of pairs of members may be provided of gradually reduced dimensions so that a strip of metal fed to the first pair of members will be slightly bent and will be finally shaped to trough formation at the last pair of members. The strip may then be moved from the last pair of members over a stationary mandrel of substantially the same form as the trough-shaped strip as it leaves the rollers. The strip is fed in a series of intermittent movements, a given length thereof being passed beneath a series of cutters with each movement. The cutters are then operated and a section of the strip severed after which reciprocable dies operate to complete the formation of the plate by bending the same about a final forming member or mandrel. The severed complete plate is then stripped from the mandrel by the passage of succeeding plates as the machine continues to operate. The various forming members and dies are operated from a common source of power and in the proper timed relation as will be more fully understood by reference to the accompanying drawings in which, Fig. 1 is an elevational side view of the machine embodying the present invention;

Fig. 2 is a diagrammatic plan view of the machine on a reduced scale;

Fig. 3 is a plan view of the machine shown in Fig. 1;

Fig. 4 is a sectional view taken on line IV—IV in Fig. 3;

Fig. 5 is a fragmentary detailed view showing a driving shaft with cam members thereon;

Fig. 6 is a perspective view of a plate applied to a support of a radiotron stem;

Fig. 7 is an end view of the machine showing mechanism for operating the final forming dies;

Fig. 8 is a fragmentary perspective view showing the relative position of the cutter members as well as the forming dies;

Fig. 9 is a perspective view showing a bridging or guide member; and

Fig. 10 is a perspective view of a plate as discharged from the machine.

As shown in the drawing, the present example of a machine for practicing the invention may include a bed-plate 10 suitably supported to carry the various movable elements of the machine. A pair of bearing blocks 11 and 12 are mounted longitudinally and on opposite sides of the bed-plate in spaced relation for the disposition of forming members therebetween.

In the present embodiment of the invention six pairs of forming members are provided although any number may be employed depending upon the degree of the bend required and the properties of the metal being formed. Each pair of forming members is comprised of an upper grooved female roller-member 13 and a lower male roller-member 14. The upper rollers are mounted on shafts 15 journaled in the bearing-blocks 11 and 12 and the lower rollers are mounted on shafts 16 journaled in the said bearing-blocks.

It will be noted that the bearing-blocks 11 and 12 (see Fig. 4) are composed of upper and lower bearing-members 17 and 18 respectively. The upper members 17 are secured to the lower members by means of studs 19 threadedly engaging the lower members and passing through slots 21 in the upper members. By reason of this composite bearing, the relative positions of the forming rollers may be changed as their effective surfaces become worn.

Each of the shafts 15 to which the roller-member 13 is secured is provided with a gear-wheel 22. Motion is transmitted to the gear-wheel through a secondary driving-shaft 23 having gear-wheels 24 and 25 secured thereto. The gear-wheel 24 is disposed between and in mesh with two of the gear-wheels 22 to positively drive the forming members at the last or final bends performed by the rollers. Motion is translated throughout the remaining rollers by means of interposed idler gear-wheels 26 which serve to transmit motion and effect a rotation of the upper forming rollers in a common direction.

The lower forming rollers which operate in conjunction with the upper rollers driven through gear-wheel 25 which is disposed in mesh with an idler gear-wheel 27 (see Fig. 1) in mesh with gear-wheels 28 and 29 secured to the shaft 16 which carry the lower roller members.

It has been found necessary to drive only the last two pairs of lower forming members although if desirable, suitable gearing may be provided to positively drive other members. A strip of metal or other material 29 may be fed to the forming rollers direct or a series of idler rollers 31 (see Fig. 2) may be provided to partially shape the strip as it is drawn therebetween from a spool 32. The several pairs of roller forming members are operated intermittently and are of an accurate predetermined diameter and may be driven in a series of intermittent movements, each movement resulting in a paritial or complete rotation of the roller members depending upon their diameter. The roller members may, therefore, be moved to drive the strip 29 a given distance with each intermittent movement of the rollers to feed the desired length of the formed strip to position to be severed by cutters which will presently be described.

The machine may be operated to effect a movement of the rollers and other various parts from any suitable source of power as for example a motor (not shown). If a motor is employed the same may be connected to a driving pulley 33 secured to a main driving-shaft 34 by a belt 35.

As illustrated in the present embodiment of the invention the shaft 34 is provided with a worm 36 in mesh with a worm-wheel 37 secured to a primary driving-shaft 38 having a spiral-gear 39 secured thereto and disposed in mesh with a companion-gear 41. The gear 41 may be secured to a vertical shaft 42 upon which a driving member 43 of a Geneva movement is suitably secured. The member 43 is engageable with and drives the slotted member 44 of the geneva which is secured to a spindle 45 having a bevel-gear 46 attached to its upper end. The bevel-gear 46 may be disposed in mesh with another bevel-gear 47 secured to the shaft 23 which drives the several pairs of roller forming members.

An operation of the machine causes the geneva to actuate the roller members, causing their partial rotation to bend and drive the strip 29 through a predetermined path and over a former-member 48 (see Fig. 8). When the strip moves upon the former-member it is of trough or U-shape configuration in transverse cross section and is moved by the rollers until a sufficient length thereof has passed between a plurality of cutter members comprising laterally operable punches 49 and 51 and a vertical punch 52. The member 48 in combination with the punches constitutes what may be termed a piercing die so that when a section of the article, such as the present plate, is severed from the main length a narrow strip thereof is punched out and a shearing operation is avoided.

It will be appreciated that by reason of the present punching arrangement, a clean sharp edge is provided on the article which is a very essential feature in the manufacture of an article such as a plate for use in radiotrons. After the severing operation, the severed section is moved by reason of the intermittent movement of the rollers and the following strip, to position over a forming die or mandrel 53 against which the flat side portions of the strip are pressed by a pair of forming members 54 and 55. The mandrel 53 is made of such configuration in transverse cross section that when the trough-shape section is bent therearound by the forming-members, a plate 56 will result having longitudinal flanged edges 57 provided with oppositely disposed beads 58. The beads 58 are positioned so that they cooperate to provide a tubular member 59 to receive a support 61 as shown in Fig. 6, when the plate is positioned preparatory to use in an electrical device.

The severing operation and the forming operation performed on the severed strip are accomplished substantially simultaneously. The punches 49 and 51 may be integral or suitably attached to slide-bars 62 and 63 respectively which are movable in suitable guides 64 and 65. Motion may be imparted to the slide-bars through a box-cam 66 fastened to the primary driving-shaft 38. The cam 66 is engageable with a pin 67 at one end of a reciprocable connector member 68. The member 68 is slidable on a guide 69 which may be integral with the bed-plate of the machine and is connected to an arm of a bell-crank member 72 pivoted on shafts 73 and 74 suitably secured to the bed-plate 10 of the machine.

The movable forming dies 54 and 55 are slidable between guides 75 (see Figs. 3 and 7) and are operable through a box-cam 76 secured to the shaft 38. A connector member 77 reciprocable upon a guide 78 is provided with a pin 79 engageable with the cam 76 and as shown in Fig. 7 connector member 77 is pivotally attached to arms 81 and 82 of bell-crank members 83 and 84 respectively. The connector-member 77 may be provided with a slot 80 in which a pin 80' secured to the guide 78 is disposed, thus retaining the connector-member in a given vertical path.

The opposite arms 85 and 86 of the bell-crank members 81 and 82 respectively are of bifurcated form and provided with projections 87 engageable in slotted collars 88 threadedly connected to projections 89 and 91 integral with the forming dies 54 and 55 respectively. The bell-crank members 72 which operate the slide-bars 62 and 63 are similar in construction to the bell-crank members 83 and 84 and, as shown in Fig. 3, have bifurcated ends 92 and 93 engageable with collars 94 and 95 threadedly connected to projections 96 and 97 integral with the slide-bars 62 and 63.

It will be evident that a rotation of the box-cams 66 and 76 will cause a simultaneous action of the punches and the reciprocable forming dies. The punches 49 and 51 are operated first to partially sever the trough-shape strip and the vertically operable punch 52 is then actuated to complete the severing operation. This punch 52 may be secured to or may be integral with a shank 98 slidable in a guide 99 and connected by an arm 101 to a plunger 102. The plunger may be reciprocable in a vertical guide-bearing 103 and the lower end thereof may be provided with a head 104 having a pin 105 engageable with a box-cam 106 secured to the shaft 38.

The box-cam 106 may have its track or guide-slot so formed, as to actuate the plunger 102 and consequently the punch 52 immediately after the cams 66 and 76 cause the punches and forming dies to operate. It will be understood that the operation in the proper sequential order is entirely a matter of adjustment or timing of the cams or other driving elements that may be employed.

When the machine is operated the strip 29 of metal may be fed under the guide-rollers 31 and thence to the forming rollers which continue to bend and drive the bent strip through a rectilinear path. Suitable spacer members or guides 107 (see Figs. 1 and 9) may be employed to bridge the spacers between the lower roller members and thus support the strip during its passage therebetween.

The guides 107 are formed with rounded portions 108 and partly encircle the rollers 14 so as to provide a support substantially between the points of contact of the pairs of rollers. The strip having passed the initial forming rollers is then engaged by the last two pairs of rollers which, in conjunction with the Geneva movement, may be considered as a gauge or a measuring device. These rollers are of equal diameters and may be made of hardened steel or other suitable long wearing material. The rollers are driven by means of the geneva in a series of intermittent movements so that each movement of the rollers will drive the strip a distance equal to the length of the article to be severed.

In the present construction a four position Geneva movement is employed and the ratio between the geneva and the rollers is such, that with each movement of the geneva the rollers are moved a quarter of a revolution which, by reason of the diameters of the rollers which drive the strip, is sufficient to move the strip a distance equal to the length of the article desired. It will be understood that the distance the article is driven with each movement may be varied either by changing the diameters of the forming rollers or by changing the ratio of the bevel-gears 46 and 47.

When a bent trough-shaped strip is driven forward by a movement of the geneva, the rollers remain at rest while the shaft 38 actuates the several cams, causing an actuation of the punches 49 and 51 to partially sever the strip and at the same time causing an actuation of the forming dies 54 and 55 to form a strip which has previously been positioned therebetween. Immediately after the punches have laterally perforated the strip, the vertical punch descends and completely severs the same. The next movement of the geneva then causes the strip to be driven forward and thrust articles along the mandrel 53, each movement of the strip serving to eject an article from the machine.

The present invention is believed to be an important step in the manufacture of electrodes such as plates or the like for radiotrons, since it combines the desired high speed with the necessary accuracy both as to the lineal dimensions and the symmetric formation of the article.

Although a preferred embodiment of the invention is shown and described herein, it is to be understood that modifications may be made therein without departing from the spirit and scope of the appended claims.

What is claimed is:

1. A machine for producing a tubular body from a strip comprising a plurality of pairs of oppositely disposed rotatable members for engagement with opposite sides of a strip to drive the same through a given path, the contact surfaces of said pairs of members decreasing in area in the direction of movement of said strip and operating to bend the strip to trough-shape and reciprocable forming members for imparting a final bend to the strip to produce a tubular body.

2. A machine for producing a tubular body comprising roller members for initially bending a strip of metal to trough-shape, a plurality of cutters, means for actuating said cutters to sever a section of said strip and reciprocal members for finally forming the severed section to provide a tubular body.

3. A machine for producing a tubular body comprising a plurality of pairs of roller members for initially bending a strip of metal to trough like form, said roller members being of progressively decreasing widths, means for severing a section of said bent strip and reciprocable members for finally forming said bent section to close the trough and produce a tubular body.

4. In a machine for producing radiotron plates, the combination with roller members for initially bending a strip of metal, means for intermittently actuating said members to propel said bent strip through a given path, cutter members disposed adjacent said path, means for actuating said cutter members to sever a section from said strip, means for performing a final bending operation upon said severed section and means to produce beaded portions along the adjacent edges thereof.

5. In a machine for producing radiotron plates, the combination with a plurality of pairs of rotatable members for bending a strip of metal to trough shape, means for intermittently actuating said members to propel said strip through a given path, cutter members disposed adjacent said path, means for actuating said members to sever a section from said strip and means for bringing the edges of said trough-shaped section together.

6. In a machine for producing radiotron plates, the combination with a plurality of pairs of rotatable members for bending a strip of metal to trough shape, means for intermittently actuating said members to propel said strip through a given path, cutter members disposed adjacent said path, means for actuating said members to sever a section from said strip and means for shaping opposite edges of said trough-shaped section to provide beaded flanges.

7. In a machine for producing radiotron plates, the combination with a plurality of pairs of rotatable members for bending a strip of metal to trough shape, means for intermittently actuating said members to propel said strip through a given path, cutter members disposed adjacent said path, means for actuating said members to sever a section from said strip and reciprocable members operable to bend the edges of said trough-shaped section together.

8. In a machine for producing radiotron plates, the combination with a plurality of pairs of rotatable members for bending a strip of metal to trough shape, means for intermittently actuating said members to propel said strip through a given path, cutter members disposed adjacent said path, means for actuating said members to sever a section from said strip and reciprocable forming dies operable to engage the edges of said trough-shaped section and bend the same together in the form of beaded flanges.

9. In a machine for producing radiotron plates comprising forming rollers operable intermittently to bend and propel a strip of metal a predetermined distance through a given path, cutter members disposed adjacent said path operable after each intermittent movement of said roller members to sever a section of the strip equal in length to the distance moved by said members and the means for performing a final bending operation to produce to tubular body.

10. In a machine for producing radiotron plates comprising forming rollers operable intermittently to bend and propel a strip of metal a predetermined distance through a given path, cutter members disposed adjacent said path operable after each intermittent movement of said roller members to sever a section of the strip equal in length to the distance moved by said members and reciprocable members operable to bend the edges of the severed strip to flanged form.

11. In a machine for producing radiotron plates comprising forming rollers operable intermittently to bend and propel a strip of metal a predetermined distance through a given path, cutter members disposed adjacent said path operable after each intermittent movement of said roller members to sever a section of the strip equal in length to the distance moved by said members and reciprocable members operable to bend opposite edges of said strip together.

12. In a machine for producing radiotron plates comprising forming rollers operable intermittently to bend and propel a strip of metal a predetermined distance through a given path, cutter members disposed adjacent said path operable after each intermittent movement of said roller members to sever a section of the strip equal in length to the distance moved by said members, a mandrel and reciprocable forming dies operable to bend the edges of said strip to provide adjacent beaded flanges to receive a support member.

13. A machine for forming tubular bodies from a metallic strip comprising means for moving a strip through a given path, means for initially forming the strip to trough-shape, means for making a plurality of cuts in said trough in a plane transverse to the path of movement of the strip to partially sever the same, means for completing the severing operation to produce a trough-shaped section, and means for shaping said section to tubular form.

14. A machine for making a radiotron plate comprising means for intermittently moving a strip of metal a predetermined distance, means for bending the strip longitudinally during such movement, means for severing the strip after each movement thereof and means operable synchronously with the severing means for performing a final bending operation upon the severed section.

15. A machine for making a radiotron plate comprising means for intermittently moving and bending a strip of metal to trough-shape, severing means for removing a section from said strip, presser members for shaping the severed section and means for substantially simultaneously actuating the cutter members and the forming members to produce a plate.

16. The method of forming a radiotron plate which consists in shaping a strip of metal to trough-shape, moving the trough-shaped strip a predetermined distance, temporarily terminating such movement, severing the strip to remove a piece therefrom equal in length to the distance through which the same has moved, moving the trough-shaped piece over a forming die and shaping the piece by pressing against the die.

17. The method of making a plate for radiotrons which consists in moving a strip of metal a predetermined distance, shaping the strip during such movement, positioning a section of the strip equal in length to the above mentioned distance through which it has moved adjacent to a forming member, the transverse cross-section of which is the same as that desired in the finished plate, terminating the movement of said strip, severing said section of the strip and pressing the same against said forming member.

In testimony whereof, we have hereunto subscribed our names this 15th day of June 1925.

HARRY DE FOREST MADDEN.
JOSEPH KIRBY.